United States Patent [19]

Morris

[11] Patent Number: 5,251,579
[45] Date of Patent: Oct. 12, 1993

[54] CYLINDER LINERS

[75] Inventor: Leonard E. Morris, Colne, United Kingdom

[73] Assignee: AE Auto Parts Limited, England

[21] Appl. No.: 860,252

[22] Filed: Mar. 31, 1992

Related U.S. Application Data

[63] Continuation of Ser. No. 731,279, Jul. 17, 1991, abandoned.

[30] Foreign Application Priority Data

Jul. 20, 1990 [GB] United Kingdom ............ 9015932

[51] Int. Cl.⁵ .................................................. F01P 3/02
[52] U.S. Cl. ................................ 123/41.84; 123/195 R
[58] Field of Search .............. 123/41.83, 41.84, 195 R

[56] References Cited

U.S. PATENT DOCUMENTS

| | | | |
|---|---|---|---|
| 1,226,820 | 5/1917 | Shultz | 123/195 R |
| 1,396,890 | 11/1921 | Short | 123/41.83 |
| 1,420,684 | 6/1922 | Bradshaw . | |
| 1,607,265 | 11/1926 | Leipert . | |
| 1,643,645 | 9/1927 | Strand | 123/41.84 |
| 1,665,192 | 4/1928 | Spence | 123/41.84 |
| 2,010,183 | 8/1935 | Furay | 123/41.83 |
| 2,037,354 | 4/1936 | Treiber | 123/173 |
| 2,078,499 | 4/1937 | Ljungström | 92/149 |
| 2,148,639 | 2/1939 | Pielstick | 92/149 |
| 2,338,183 | 1/1944 | Jagersberger | 123/191 |
| 2,405,847 | 8/2946 | Pullin | 123/173 |
| 2,511,823 | 6/1950 | Klotsch | 123/195 |
| 2,635,591 | 4/1953 | Kiekhaefer | 123/41.29 |
| 2,748,757 | 6/1956 | Morris | 123/53 |
| 2,783,749 | 3/1957 | Effman | 123/41.83 |
| 2,851,020 | 9/1958 | Dolza | 123/41.69 |
| 2,855,910 | 10/1958 | De Waern | 123/41.17 |
| 2,951,472 | 9/1960 | Skubic | 123/41.72 |
| 3,086,505 | 4/1963 | Bovard | 123/41.8 |
| 3,315,573 | 4/1967 | De Castelet | 123/41.72 |
| 3,400,695 | 9/1968 | Zaruba | 123/41.82 |
| 3,403,661 | 10/1968 | Valentine et al. | 123/41.84 |
| 3,418,993 | 12/1968 | Scheiterlein et al. | 123/195 |
| 3,568,573 | 3/1971 | Bailey | 92/171 |
| 3,618,575 | 11/1971 | Coates et al. | 123/90.35 |
| 3,628,427 | 12/1971 | Bailey | 92/144 |
| 3,653,369 | 4/1972 | Fangman et al. | 123/193 |

(List continued on next page.)

FOREIGN PATENT DOCUMENTS

| | | |
|---|---|---|
| 214713 | 4/1961 | Austria . |
| 1908411 | 9/1970 | Fed. Rep. of Germany . |
| 2030983 | 1/1971 | Fed. Rep. of Germany . |
| 2140378 | 2/1973 | Fed. Rep. of Germany . |
| 1043913 | 11/1953 | France . |
| 1116882 | 5/1956 | France . |
| 2441728 | 6/1980 | France . |
| 275926 | 10/1927 | United Kingdom . |
| 406000 | 2/1934 | United Kingdom . |
| 491545 | 9/1938 | United Kingdom . |
| 522730 | 6/1940 | United Kingdom . |
| 615045 | 12/1948 | United Kingdom . |
| 1027810 | 4/1966 | United Kingdom . |
| 1215111 | 12/1970 | United Kingdom . |
| 1244800 | 9/1971 | United Kingdom . |
| 1449473 | 9/1976 | United Kingdom . |
| 1479139 | 7/1977 | United Kingdom . |
| 2034419A | 6/1980 | United Kingdom . |

OTHER PUBLICATIONS

CIMAC 9th International Congress on Combustion Engines; Stockholm, Sweden, 1971–William W. Peters no month provided.
British Standard 3526: 1962–Specification for Dimensions of Wet Type Cylinder Liners for I.C. Engines–Part 1 no month provided.

*Primary Examiner*—E. Rollins Cross
*Attorney, Agent, or Firm*—Nixon & Vanderhye

[57] ABSTRACT

A combustion engine has a cylinder liner with a top boss which is an interference fit in the block, and a midstop flange. The outer portion of the liner between the top boss and the midstop flange forms a wall of a coolant passage. A cylindrical inner portion of the liner is at least 30% of the length of the liner, and has a groove in the outer surface thereof adjacent to its bottom end. In the groove is a support ring which swells up under the influence of engine oil to contact a radial support section for the bottom end of the cylinder liner.

13 Claims, 2 Drawing Sheets

U.S. PATENT DOCUMENTS

| | | | |
|---|---|---|---|
| 3,714,931 | 2/1973 | Neitz et al. | 123/41.79 |
| 3,745,980 | 7/1973 | Pekar, Jr. et al. | 123/41.74 |
| 3,853,099 | 12/1974 | Feather et al. | 123/41.82 |
| 3,882,842 | 5/1975 | Bailey et al. | 123/193 |
| 3,996,913 | 12/1976 | Hamparian | 123/198 |
| 4,082,068 | 4/1978 | Hale | 123/41.02 |
| 4,095,803 | 6/1978 | Meier et al. | 277/12 |
| 4,131,093 | 12/1978 | Mansfield | 123/41.85 |
| 4,147,140 | 4/1979 | Mansfield | 123/41.77 |
| 4,237,847 | 12/1980 | Baugh et al. | 123/195 R |
| 4,244,330 | 1/1981 | Baugh et al. | 123/41.84 |
| 4,284,037 | 8/1981 | Kasting | 123/41.72 |
| 4,294,203 | 10/1981 | Jones | 123/195 R |
| 4,305,348 | 12/1981 | Martin | 123/41.82 |
| 4,369,627 | 1/1983 | Kasting et al. | 60/605 |
| 4,399,783 | 8/1983 | Hauser, Jr. | 123/193 |
| 4,474,144 | 10/1984 | Tanaka et al. | 123/52 |
| 4,494,492 | 1/1985 | Kochanowski | 123/41.84 |
| 4,505,234 | 3/1985 | Meiners | 123/193 C |
| 4,523,555 | 6/1985 | Mezger et al. | 123/193 |
| 4,562,799 | 1/1986 | Woods et al. | 123/193 |
| 4,588,309 | 5/1986 | Uyehara et al. | 384/94 |
| 4,601,265 | 7/1986 | Wells et al. | 123/41.28 |
| 4,638,769 | 7/1988 | Ballheimer | 123/41.84 |
| 4,759,317 | 7/1988 | Ampferer | 123/41.74 |
| 4,791,891 | 12/1988 | Kubis et al. | 123/193 C |
| 4,867,119 | 9/1989 | Cooper et al. | 123/193 P |
| 4,926,801 | 5/1990 | Eisenberg et al. | 123/41.83 |
| 2058912A | 4/1981 | United Kingdom . | |
| 2143899A | 2/1985 | United Kingdom . | |
| 2144140A | 2/1985 | United Kingdom . | |

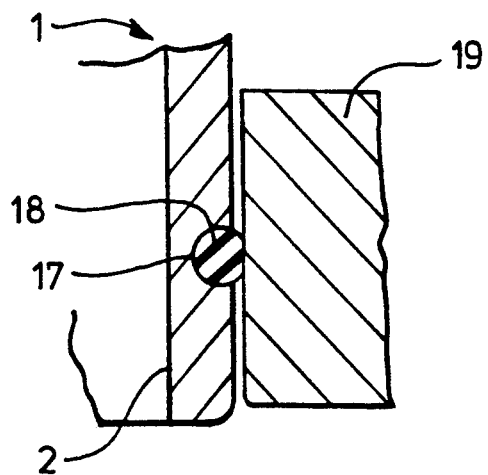
FIG.2
FIG.3
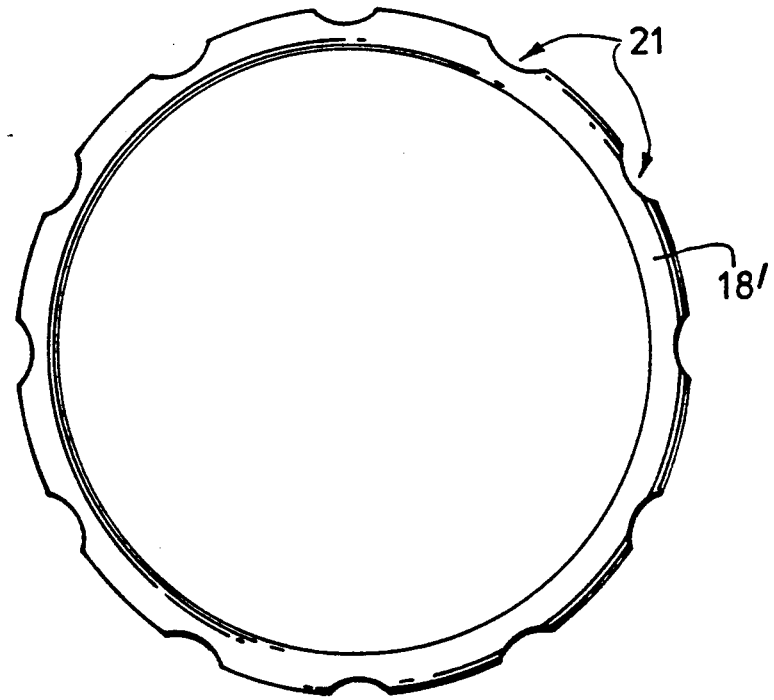

CYLINDER LINERS

This is a continuation of application Ser. No. 07/731,279, filed Jul. 17, 1991, now abandoned.

BACKGROUND AND SUMMARY OF THE INVENTION

This invention relates to cylinder liners, and in particular to cylinder liners which are designed as wet liners with a mid-stop flange incorporated into the liner.

For convenience in this specification and the accompanying claims, each constituent cylinder liner in an engine block in accordance with the present invention is considered to have an axis of symmetry which extends vertically above a co-operating crankshaft. The end of the liner remote from the crankshaft is referred to as the top or upper end, and the other end (closest to the crankshaft) is referred to as the top lower or bottom end. Approximately from the level of the midstop flange to the upper end of the liner is considered the outer portion of the liner, and the remaining portion from said midstop flange level to the bottom end is considered the inner portion of the liner. However, it will be understood that references describing the relative positions of the ends, and of the two constituent portions, of any arrangement within an engine block of a liner in accordance with the present invention, are included in the corresponding references given above with respect to the arrangement of a liner extending vertically above the crankshaft.

Further, the term radial, or radially-extending, is used in respect of any distance, or feature, extending in any direction in a plane at right angles to the axis of the cylinder liner; and the term axial, or axially-extending, is used in respect of any distance, or feature, extending parallel to the liner axis.

A cylinder liner of the general type to which the present invention relates is described and claimed in UK Patent No 2 035 452. This specification describes a cylinder liner which has, in combination, a series of features which include a top boss on the liner, the top boss having an axially extending cylindrical surface forming an interference fit with the engine block when in position; a midstop flange with a surface which extends radially outwardly from the liner and engages a complementary radially extending ledge in the engine block; an upper portion between the top boss and the midstop flange which forms a wall of a coolant passage, the axial length of which passage wall is not more than 30% of the axial length of the liner; and an inner portion which has an axial length of at least 30% of the axial length of the liner, and which is wholly free of direct supporting and heat conducting contact with the engine block.

In practice this liner design suffers from the disadvantage that lack of radial support at its bottom end allows the inner portion of the liner to ovalise during use to an undesirable extent, and under extreme conditions this is liable to lead to cracking of the liner.

From a practical point of view, however, it is difficult to provide an adequate support at the bottom end of the liner since this end of the liner is to be inserted into the block first, and the liner has an interference fit on the top boss, as stated above.

An object of the present invention is to provide a liner which is able to have adequate radial support at its bottom end, and yet is readily fitted in the engine block.

Thus, according to the present invention there is provided in an internal combustion engine having a block containing a cylinder cavity extending between the engine head and a crankshaft to which a piston is connected for reciprocating travel within the cylinder cavity, a liner stop positioned intermediate the ends of the cylinder cavity, a liner coolant passage formed to provide coolant to the outer surface of the liner, and a substantially annular radial support section for the bottom end of the liner, a substantially cylindrical replaceable cylinder liner having top and bottom ends which comprises:

i) a top end boss having a cylindrical axially extending outer surface forming an interference fit within the cylinder cavity, (ii) a midstop flange having a radially extending surface which engages the liner stop in the cylinder cavity, (iii) a portion between the top boss and midstop flange which forms a wall of the coolant passage, (iv) a substantially cylindrical inner portion below the midstop flange which forms at least 30% of the axial length of the liner, (v) an annular groove in the outer surface of the liner adjacent to the bottom end of the liner, and (vi) a support ring located in said groove, the ring having an outside diameter not substantially greater than an outside diameter of the bottom end before use, and a material which will swell under the influence of engine oil to thereby cause the support ring to contact the substantially annular radial support section.

It will be appreciated that at the bottom end of the liner, the support ring is effectively retracted when the liner is fitted, but swells to contact the annular radial support section, to give damping and radial support for the bottom end of the liner when in use in the engine.

The substantially annular radial support section for the bottom end of the liner may be discontinuous if gaps are required through which oil can drain, for example, but it is important that the support section is present at those locations on the block which are opposite to the thrust and non-thrust faces of the liner, that is, in the plane within which a connecting rod will move when it is attached to a piston located in the liner, such plane also being perpendicular to the axis of rotation of the crankshaft of the engine.

If desired, the support ring may be notched or otherwise shaped to ensure that oil can drain past the ring. The preferred material for the support ring is a rubber compound, which is preferably also heat conductive to ensure that the rubber does not form a thermal barrier between the bottom end of the cylinder liner and the annular radial support section of the block. Preferred rubbers are nitrile rubbers, fluoroelastomers such as Viton, which is a copolymer of vinylidene fluoride and hexafluoropropylene, and chloropolymers such as Neoprene, which is 2-chloro-1, 3-butadiene.

The invention will now be described in more detail, by way of example only, with reference to the accompanying drawings.

BRIEF DESCRIPTION OF THE DRAWINGS

FIG. 2 is an enlarged view of a fragment of FIG. 1 showing a support ring located in a groove at the bottom end of the liner, and after contact with engine oil, the ring having swollen to contact an annular radial support section of the engine block, and FIG. 3 is a plan view of an alternative form of support ring to that shown in FIGS. 1 and 2.

DETAILED DESCRIPTION OF THE DRAWINGS

Figure 1:
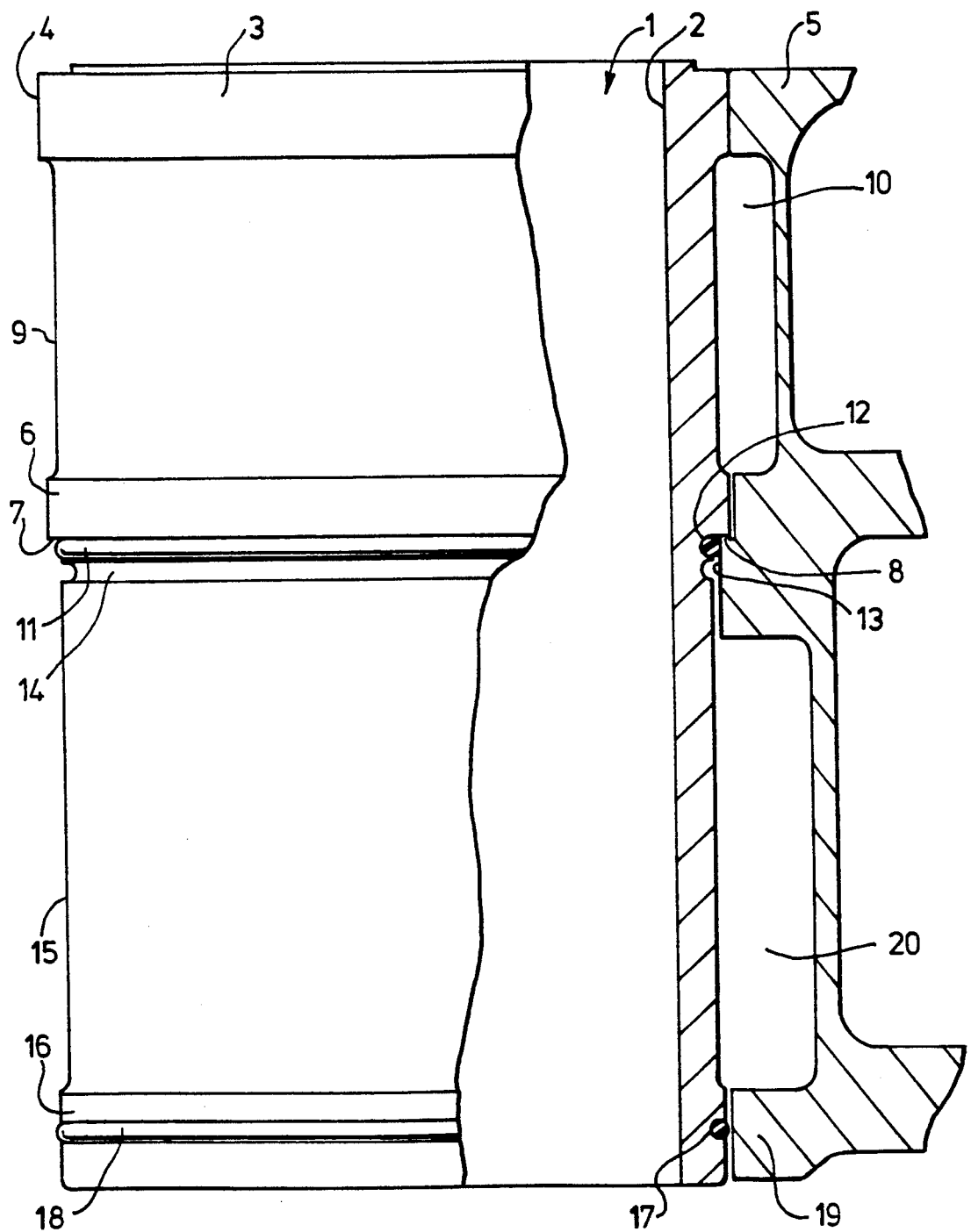
FIG. 1 is a side view of a cylinder liner in accordance with the invention at the time of fitting, partly in section, the sectional part of the figure also showing schematically in section adjacent portions of the engine block.

As shown in FIG. 1, a cylinder liner has a smooth cylindrical inner surface 2, against which a piston is to run, and also has an outer surface profile with several features. The top end of the cylinder liner 1, which is adjacent to a cylinder head (not shown) when in an engine, has a top boss 3 with an axially extending cylindrical outer surface 4 which makes an interference fit with an engaging section 5 of the engine block when the liner is in position in the cylinder cavity. Adjacent the mid-length of the liner is located a midstop flange 6, the lower surface 7 of which extends radially outwardly from the liner axis, and forms a sealing, and axially locating, engagement with an annular liner stop 8 in the engine block.

Between the top boss 3 and the midstop flange 6 lies a portion of the liner 9 which forms one wall of a channel 10 for coolant for the liner.

This coolant channel 10 is sealed at the top of the liner by the interference fit between the top boss 3 and engaging block section 5, with a back-up seal being provided in the engine by a cylinder head gasket (not shown). At the midstop flange the coolant channel is sealed in any convenient way, but in the illustrated arrangement is sealed first by the engagement of the lower flange surface 7 with the annular liner stop 8. A second seal is provided by means of a rubber sealing ring 11 located in a groove 12 in the liner below the midstop flange 6. The rubber sealing ring 11 seals against an annular sealing surface 13 provided in the engine block below the liner stop 8. A second groove 14 is provided on the liner surface below the groove 12 and may be used for further sealing material if required.

An inner portion 15 of the liner extending from below the seal or seals beneath the midstop flange has an accurately defined register 16 on the bottom end of the liner. Within this register 16 there is provided a groove 17 extending around the liner and containing a rubber support ring 18.

A radial support section 19 for the bottom end of the liner is provided within the engine block adjacent the bottom register 16 on the liner. The cross sectional area of the rubber support ring 18 as fitted to the liner is such that it is accommodated within the groove 17 so that the outside diameter of the rubber ring at this time is not substantially greater than that of the register 16. Since the liner 1 is fitted into the engine block from the top, when fitting, the bottom register 16, and rubber support ring, has to pass through the annular liner stop 8; and into the radial support section 19, whilst providing the interference fit between the cylindrical outer surface 4 and the engaging section 5 of the engine block. This is readily achieved with the liner of the present invention provided that proper attention is paid to the overall diameters of the various parts of the liner.

However, once the liner has been fitted into the block, oil is introduced into the engine and contact with engine oil causes the support ring 18 to swell and fit tightly against the radial support section 19 of the engine block. The position then assumed by the ring 18 is shown in FIG. 2. The oil enters a cavity 20 between the inner portion 15 of the liner and an annular recess in the engine block, via a passage (not shown) leading from the valve train mechanism (not shown).

It will be understood that it is desirable that engine oil be able to pass the ring 18. Thus, for the liner shown in FIGS. 1 and 2 the radial support section 19 in the block is not a continuous annulus so that passages (not shown) are left for oil to pass out from the cavity 20 into the crankcase region. However, the radial support section 19 must be arranged to provide the required radial support for the bottom end of the liner adjacent those zones of the liner which are the thrust and non-thrust faces, that is in the plane within which the piston connecting rod is moving, and which plane is perpendicular to the axis of rotation of the crankshaft of the engine.

If gaps are left in the radial support section 19 as referred to in the preceding paragraph the support ring 18 may be a smooth torus as shown in FIGS. 1 and 2. However, if no gaps are left in the radial support section, or if extra oil circulation is needed, the outer surface of the support ring 18$^1$ may be notched as shown at 21 in FIG. 3, or otherwise shaped. In this case support ring 18$^1$ allows for passage of oil past the ring even after the ring has swollen into its radial support position.

More than one support ring may be provided, these rings being axially spaced apart at the bottom end of the liner.

I claim:

1. In an internal combustion engine having a block containing a cylinder cavity extending between an engine head and a crankshaft to which a piston is connected for reciprocating travel within the cylinder cavity, a liner stop positioned intermediate the ends of the cylinder cavity, a liner coolant passage adapted to provide coolant to the outer surface of a cylinder liner, and a substantially annular radial support section for a bottom end of the liner, a substantially cylindrical, replaceable cylinder liner having top and bottom ends which comprises:
   (i) a top end boss having a cylindrical axially extending outer surface forming an interference fit within the cylinder cavity,
   (ii) a midstop flange having a radially extending surface which engages the liner stop in the cylinder cavity,
   (iii) a portion between said top boss and said midstop flange which forms a wall of the coolant passage,
   (iv) a substantially cylindrical portion below said midstop flange which forms at least 30% of the axial length of the liner,
   (v) an annular groove in an outer surface of the liner adjacent to said bottom end of the liner, and
   (vi) a support ring located in said groove, said ring having an outside diameter not substantially greater than an outside diameter of said bottom end before use, and being of a material which will swell under the influence of engine oil to thereby cause said ring to contact said substantially annular radial support section.

2. A replaceable liner as claimed in claim 1 in which said substantially annular radial support section for the bottom end of the liner is configured to permit engine oil to drain past the support ring.

3. A replaceable cylinder liner according to claim 1 in which said support ring is notched to ensure that engine oil can drain past the ring.

4. A replaceable cylinder liner according to claim 1 in which said support ring is of a rubber compound.

5. A replaceable cylinder liner according to claim 4 in which said rubber compound is a nitrile rubber compound.

6. A replaceable cylinder liner according to claim 1 in which said support ring is heat conductive.

7. A replaceable cylinder liner for an internal combustion engine having a block with at least one cylinder cavity provided therein, the cylinder cavity defined in part by an annular liner stop located axially between upper and lower ends of the cavity and a radial support at the lower end thereof, said liner comprising:
- a top end boss having a cylindrical outer surface extending axially of said liner and adapted to form an interference fit within the upper end of the at least one cylinder cavity;
- a midstop flange having a radially extending surface adapted to engage the annular liner stop in the at least one cylinder cavity;
- a substantially smooth cylindrical portion extending between said top end boss and said midstop flange and having a length not more than 30% of a total axial length of the liner;
- a radially outwardly extending register at a bottom end of the liner, said register having an outer diameter less than each of said midstop flange, the liner stop and the radial support surface, thereby enabling said bottom end of the liner to pass said liner stop in the cylinder cavity when fitting the liner in the cylinder block;
- a groove in an outer surface of said register; and
- a support ring located in said groove and constructed of a material which, when exposed to engine oil, will swell into engagement with the radial support surface in the block, and wherein said support ring is notched about its circumference to allow engine oil to drain past the ring.

8. The liner according to claim 7 wherein the support ring is constructed of a rubber compound.

9. The liner according to claim 8 in which said rubber compound is a nitrile rubber compound.

10. The liner according to claim 7 in which said support ring is heat conductive.

11. The liner according to claim 7 and including a substantially cylindrical portion below said midstop flange which extends axially at least 30% of the axial length of the liner.

12. An internal combustion engine having a block containing a cylinder cavity extending between an engine head and a crankshaft to which a piston is connected for reciprocating travel within the cylinder cavity, a liner stop positioned intermediate the ends of the cylinder cavity, a liner coolant passage adapted to provide coolant to the outer surface of a cylinder liner, and a substantially annular radial support position for a bottom end of the liner,
- a substantially cylindrical, replaceable cylinder liner having top and bottom ends which comprises:
  - (i) a top end boss having a cylindrical axially extending outer surface forming an interference fit within the cylinder cavity,
  - (ii) a midstop flange having a radially extending surface which engages the liner stop in the cylinder cavity,
  - (iii) a portion between said top boss and said midstop flange which forms a wall of the coolant passage,
  - (iv) a substantially cylindrical portion below said mistop flange which forms at least 30% of the axial length of the liner,
  - (v) means located in said bottom end of the liner and having a first diameter for enabling said bottom end of the liner to pass said liner stop in the cylinder cavity when fitting the liner in the cylinder block and having a second diameter such that said means contacts said substantially annular radial support section during operation of said internal combustion engine to thereby provide radial support to said bottom end of said liner.

13. A replaceable cylinder liner as claimed in claim 12 wherein said means located in said bottom end of the liner is constructed of a material which will swell under the influence of engine oil to thereby cause said means to contact said substantially annular radial support section.

* * * * *